United States Patent [19]

Morita et al.

[11] Patent Number: 5,700,014
[45] Date of Patent: Dec. 23, 1997

[54] VACUUM SEALING STRUCTURE

[75] Inventors: Shinsaku Morita, Kanagawa; Yoshiyuki Sato, Tokyo, both of Japan

[73] Assignee: Japan Vac's Metal Co., Ltd., Tokyo, Japan

[21] Appl. No.: 628,746

[22] PCT Filed: Aug. 16, 1995

[86] PCT No.: PCT/JP95/01629

§ 371 Date: Jul. 1, 1996

§ 102(e) Date: Jul. 1, 1996

[87] PCT Pub. No.: WO96/04985

PCT Pub. Date: Feb. 22, 1996

[30] Foreign Application Priority Data

Aug. 17, 1994 [JP] Japan ................... 6/215324

[51] Int. Cl.$^6$ ................... F16J 15/08
[52] U.S. Cl. ............... 277/167.5; 277/171; 277/207 A; 277/236; 285/332.2; 285/336
[58] Field of Search ............... 277/167.5, 171, 277/207 A, 236; 285/332.2, 336, 379

[56] References Cited

U.S. PATENT DOCUMENTS

| | | | |
|---|---|---|---|
| 1,912,299 | 5/1933 | Parker | 285/332.2 |
| 1,936,552 | 11/1933 | Goss | 285/379 |
| 2,458,817 | 1/1949 | Wolfram | 285/332.2 |
| 2,463,196 | 3/1949 | Parker | 285/332.2 |
| 2,496,149 | 1/1950 | Cahenzli et al. | 285/332.2 |
| 2,523,578 | 9/1950 | Lewis | 285/332.2 |
| 2,775,471 | 12/1956 | Douglas | 277/171 |
| 2,919,936 | 1/1960 | Hurley | 277/167.5 |
| 3,180,662 | 4/1965 | Parlasca et al. | 277/171 |
| 3,208,758 | 9/1965 | Carlson et al. | 277/171 |
| 3,263,025 | 7/1966 | Wheeler | 277/171 |
| 3,498,649 | 3/1970 | Pfeuffer | 285/336 |
| 3,873,105 | 3/1975 | Wehner | 277/171 |
| 4,133,557 | 1/1979 | Ahlstone | 285/379 |
| 5,558,344 | 9/1996 | Kestly et al. | 277/167.5 |

FOREIGN PATENT DOCUMENTS

| | | | |
|---|---|---|---|
| 6800 | 3/1907 | France | 285/336 |
| 680231 | 10/1952 | United Kingdom | 285/379 |

OTHER PUBLICATIONS

VCR Product Catalog, Cajon Company, three pages, Apr. 1990.

Primary Examiner—Scott Cummings
Attorney, Agent, or Firm—Wenderoth, Lind & Ponack

[57] ABSTRACT

A vacuum sealing structure (1) for connecting a first connection part (13) with a second connection part (43) via a gasket (31). The first connection part (13) or the second connection part (43) is provided with a jaw (43a), having an end portion which is broadened outwardly of a pipe member forming a vacuum passage, and a support member (21) having an annular tapered groove (21a). The second connection part (43a) directly contacts the gasket (31) and a tapered groove (21a). Thus the second connection part tapered jaw (43a) is tightly pressed against the gasket (31) by fastening the support member (21) with a fastening member (15), thereby achieving a vacuum sealing structure for facilitating the sealing of a body (2) to be vacuum sealed. The body may be a viewing port (41). Since it is not necessary to secure the body (2) to a flange (21), welding for securing will not be required and no trouble will be caused with sealing. In the event that the body (2) is damaged, all that is required is to replace the body itself, enabling easy maintenance.

10 Claims, 6 Drawing Sheets 5,700,014

1

VACUUM SEALING STRUCTURE

BACKGROUND OF THE INVENTION

1. Field of the Invention

The present invention is related to a vacuum sealing structure which maintains a state of vacuum as against the atmosphere, and more particularly, is related to a vacuum sealing structure which is useful for connecting a vacuum chamber with other members or for connecting pipes with each other while maintaining a state of vacuum.

2. Description of the Prior Art

Conventionally, parts such as a monitoring window (viewing port) are vacuum sealed and mounted via a flange on vacuum equipment, such as vacuum evaporation equipment, sputtering devices, plasma generators and high vacuum experiment equipment.

FIG. 11 is a cross-sectional view showing how a conventional viewing port 41' is mounted. In the figure, reference numeral 13 denotes a pipe coupled with a vacuum sealing structure. The lower end of the pipe is welded to a vacuum chamber not shown, and the upper end of the pipe is welded to a projection protruding from an inner circumference of a knife edge type flange 11 on the body side, which is part of the vacuum sealing structure (13a shows the weld). On the upper surface of the flange 11 on the body side there is formed a knife edge 11d.

The viewing port 41' is, on the other hand, formed by welding a knife edge type outer flange 23 to a kovar cylinder 71 (73 shows the weld). The cylinder 71 is sealed with a glass sheet 45 (47 shows the seal). The inside of the vacuum chamber may be observed through the glass sheet 45. The viewing port 41' is produced when a metallic gasket 33 is pinched between and pressed tight by the outer flange 23 and the flange 11 to the extent that a knife edge 11d comes into the metallic gasket 33. As seen from above, vacuum sealing is achieved by making use of flanges and a gasket based sealing structure and sealing parts, different in kind or different in material, on the outer flange 23.

FIG. 12 is a cross-sectional view showing a conventional way of coupling pipes with each other while maintaining a state of vacuum. Reference numerals 13' and 71' in FIG. 12 denote pipes connected to the vacuum sealing structure, the ends of the pipes are welded to the flanges 23 and 23'. At the edge of each of the flanges 23 and 23' there are formed a knife edge 23d and a knife edge 23d' respectively, both being part of the vacuum sealing structure. The metallic gasket 33' is pinched between and pressed tight by the flanges 23 and 23', so that the knife edges 23d and 23d' come into the metallic gasket 33' to provide a vacuum seal. The above-mentioned sealing structure needs, however, welding or sealing, which might increase the costs of replacement of any of the parts. In addition, if the glass sheet 45, for example, is damaged after sealing the vacuum equipment, it will be necessary to replace the viewing port 41' itself consisting of the outer flange 23, the cylinder 71 welded to the flange 2, the glass sheet 45 sealed with the cylinder 71, or the cylinder 71 and the flange 23 altogether, which would increase maintenance expenses.

SUMMARY OF THE INVENTION

Accordingly, it is an object of the present invention to provide a sealing structure in which it is easy to manufacture, maintain and replace vacuum parts without welding a pipe vacuum sealed to a flange.

2

The present invention is related to a vacuum sealing structure which connects first connection parts with a second connection part via a gasket. At least one of the first or the second connection parts is provided with a jaw consisting of one end broadened outwardly of a pipe member forming a vacuum passage, and support members which are independent of the pipe member and have an annular tapered groove.

The jaw is located at one surface in direct contact with the gasket and at the other surface in contact with the tapered groove, and the supporting member is fastened with a fastening member which presses tight the tapered jaw against the gasket, thus forming the vacuum sealing structure. Further, the supporting member may be divided into 2 or more parts, and it is preferable that the gasket is annular, and rectangular in cross section.

More preferably, the gasket is metallic. The tapered groove may be provided with a vertical outer wall.

DETAILED DESCRIPTION OF THE INVENTION

Figure 1:
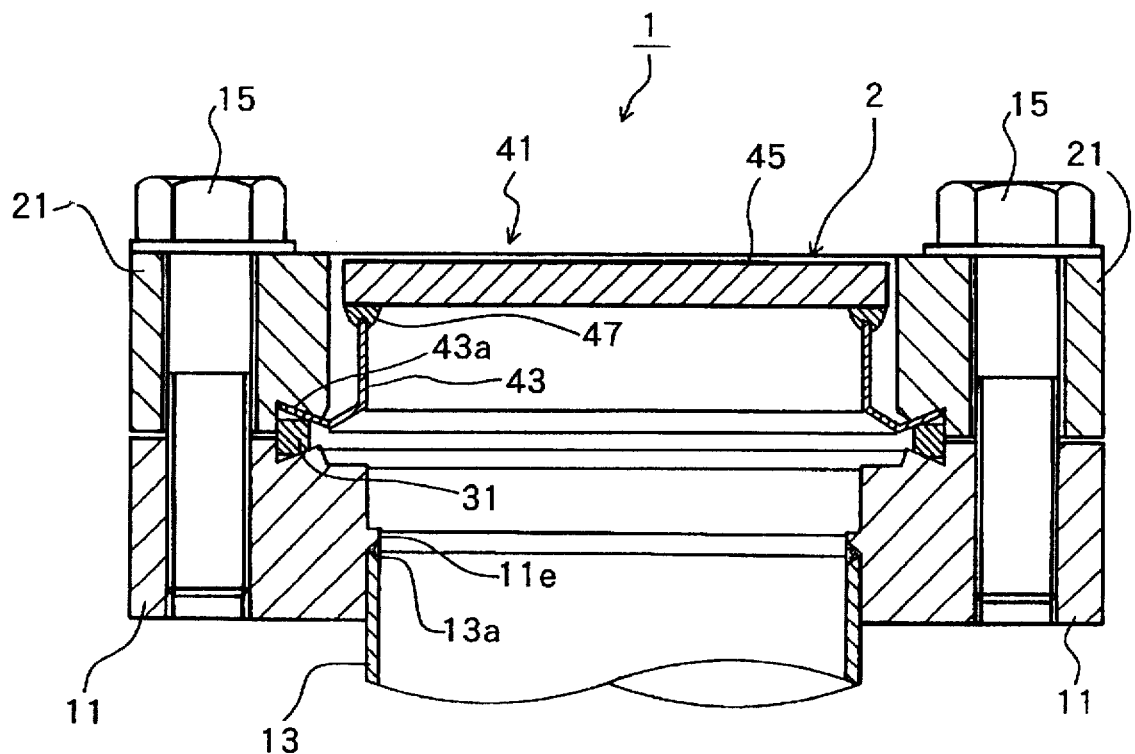
FIG. 1 is a front sectional view showing an embodiment of a vacuum sealing structure according to the present invention.

Referring now to the drawings, an embodiment of the present invention will be described. FIG. 1 shows a configuration of the present invention, and the same symbols and names will be used to describe the components of the present invention which are the same in function as those of a conventional system.

Figure 2:
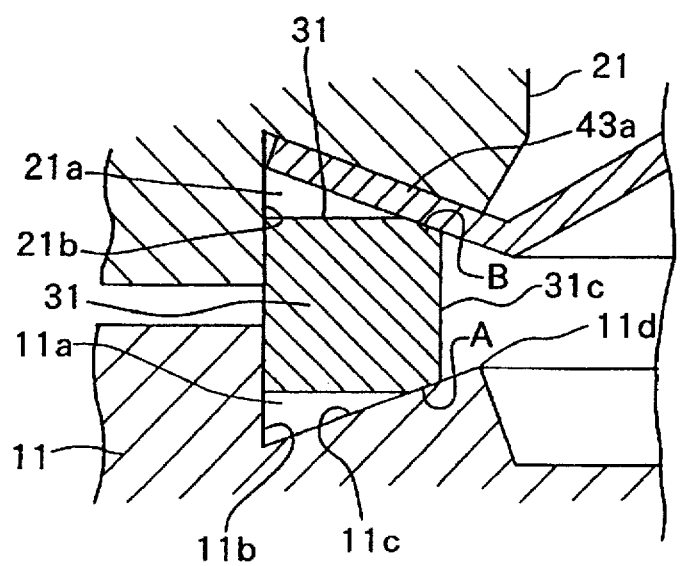
FIG. 2 is a partially enlarged sectional view showing the proximity of a rectangular, metallic gasket as shown in FIG. 1.
Figure 3:
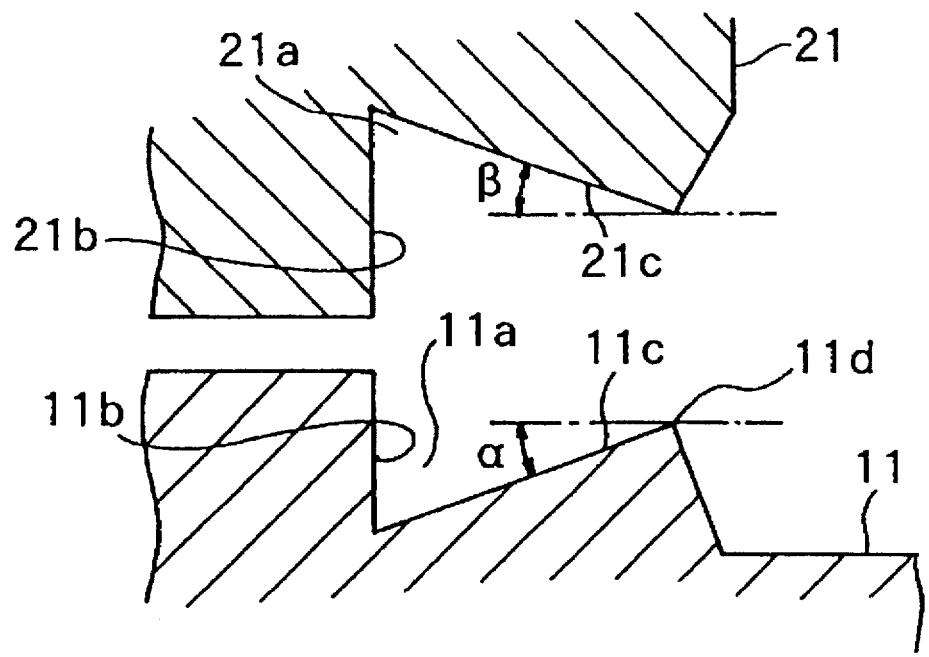
FIG. 3 is another partially enlarged sectional view showing FIG. 2 without the rectangular, metallic gasket and sheetmetal-like jaw members.

FIG. 1 shows a front sectional view of a vacuum sealing structure embodied according to the present invention, in which a viewing port 41 is a body to be vacuum sealed (vacuum sealed part). FIG. 2 is a partially enlarged sectional view of the periphery of a rectangular metallic gasket as shown in FIG. 1. FIG. 3 is similar to FIG. 2 but is shown without the rectangular, metallic gasket 31, a sheet-like jaw member 43a and a cylinder 43.

The viewing port 41 is composed of a glass sheet 45 to function as a peep window and the cylinder 43 is made of metal such as kovar, approximate in thermal expansion factor to the glass sheet 45. The outer edge of the glass sheet 45 and the upper end of the cylinder 43 are vacuum sealed using melt glass (47 shows the sealing). The other end or lower end of the cylinder 43 is bent and broadened outward to form a sheetmetal-like jaw member 43a which is inclined upwardly. A piping 13 (first connection part) is vacuum sealed and protrudes from a vacuum system body (not shown) or a vacuum bath (not shown) while a flange 11 on the body side is welded and vacuum sealed (13a is the weld). According to the present embodiment, a knife edge flange is used as flange 11 on the body side, and a tapered surface 11c on the outer circumferential side of knife edge 11d is used as a sealed groove (tapered groove) 11a. Outer circumferential side wall 11b of the sealed groove is provided in an almost vertical orientation.

Figure 4:
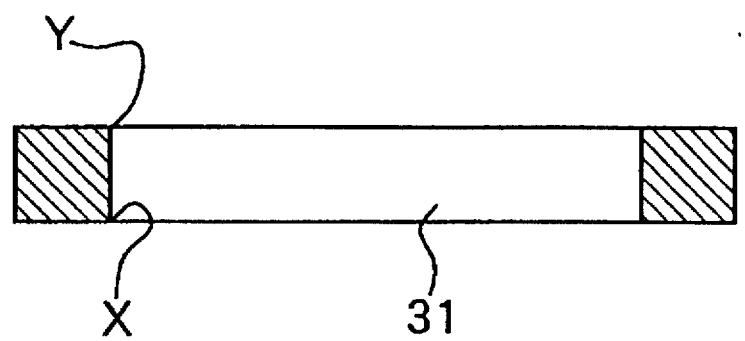
FIG. 4 is a front sectional view showing the rectangular, metallic gasket (before it is deformed due to tight pressing)

A gasket 31, rectangular in section and made of metal, is housed in the sealing groove 11a of the flange 11 on the body side. The gasket 31 is, in addition, tightly fastened by means of an outer flange (support member) 21 and a bolt (fastening member) 15 via the sheetmetal-like jaw member 43a of the cylinder 43. Sealing is carried out at the pressed portion A where the tapered surface 11c of the flange 11 on the body side is pressed tight against the rectangular, metallic gasket 31 and at the pressed portion B where the sheetmetal-like jaw member 43a is pressed tight against the gasket 31. As a result, the inner circumferential side 31c of the gasket 31 is vacuum sealed as against the exterior. Furthermore, the pressed portions A and B are plastically deformed because the gasket 31 is fastened right at the inside corners X and Y (FIG. 4) and kept flat as the tapered surface 11c of the flange 11 on the body side and the sheetmetal-like jaw member 43a of the cylinder 43 are made flat.

Tapered surfaces 11c, 21c are formed on the flange 11 and the outer flange 21, respectively. Due to the tapered surfaces the sealed grooves 11a and 21a are narrower in a depth direction. The tapered angles alpha and beta, as shown in FIG. 3 are typically 20 degrees, but 15 to 25 degrees are also suitable. The outer circumferential walls 11b and 21b, as shown in FIG. 1 through FIG. 3, are vertical, however, they may also be tapered. In addition, FIG. 1 and FIG. 2 show the flange 11 on the body side of the knife edge-type 11d, however, other types may also be used.

There is no need to limit the thickness of the sheetmetal-like jaw member 43a, but such may be the case that the jaw member 43a can be pinched by and between the rectangular, metallic gasket 31 and the outer flange 21. In addition, it is not necessary for the bent angle of the sheetmetal-like jaw member 43a to exactly coincide with the tapered angle beta of the outer flange 21. That is, since the portion does not need any sealing, it is not necessary for the sheetmetal-like jaw member 43a to contact the tapered surface of the outer flange 21 surface to surface.

It is not necessary to specify the particular material of the members. The flanges 11 and 21 may be, for example, of stainless steel, the rectangular, metallic gasket 31 of oxygen-free copper, and the cylinder 43 of metal such as kovar, including sheetmetal-like jaw member 43a. The cylinder is of kovar because it is intended to be sealed with the glass sheet 45, however, if the body to be sealed is something other than the viewing port 41, other materials will be selected accordingly.

With this arrangement, the flange 11 is drawn towards outer flange 21, using bolts (fastening members) 15. The sealed grooves (tapered grooves) 11a and 21a of the flanges 11 and 21 enable the jaw member 43a to be tightly pressed against the metallic, rectangular gasket 31, which is thereby provided with thrust in the outer circumferential direction due to the tapered surfaces 11c and 21c. As a result, the outer circumferential surfaces of the metallic, rectangular gasket 31 comes into close contact with the vertical outer circumferential walls 11b, 21b. At the same time, the inner corners X and Y (FIG. 4) of the metallic, rectangular gasket 31 are plastically deformed to flat pressed portions A and B along the jaw member 43a and the tapered surface 11c of the sealed groove (tapered groove) 11a of the flange 11. Vacuum airtightness is thus maintained and sealing as against the atmosphere is produced.

Figure 5:
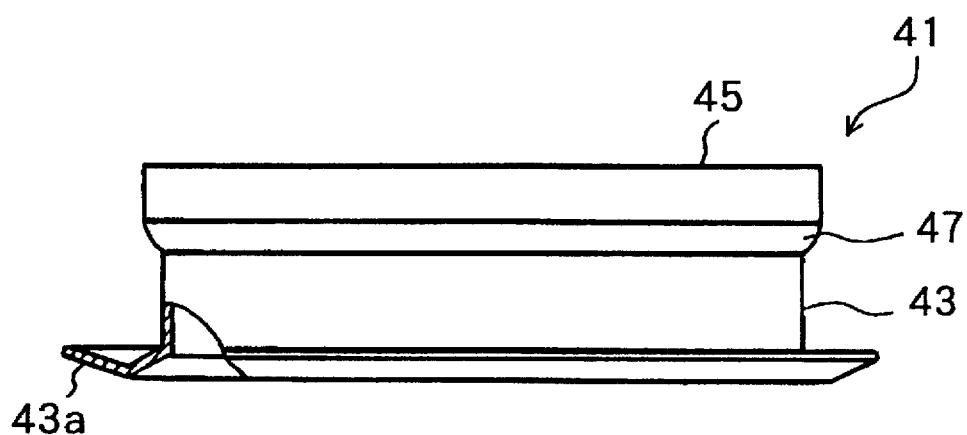
FIG. 5 is a front elevation showing a viewing port, part of the present invention, with a partial cutaway.
Figure 6:
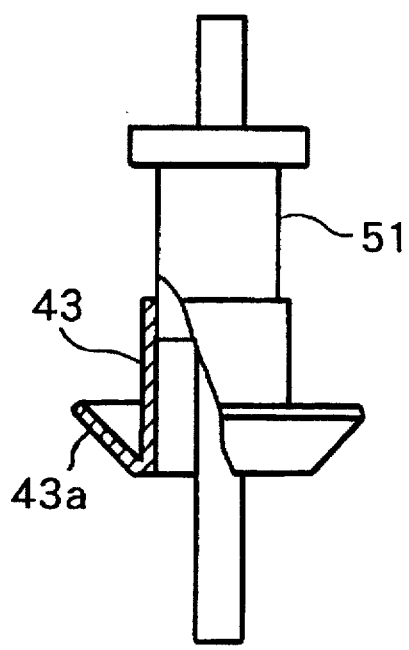
FIG. 6 is a partial cutaway, front elevation showing an electric current introductory terminal using the vacuum sealing structure according to the present invention.
Figure 7:
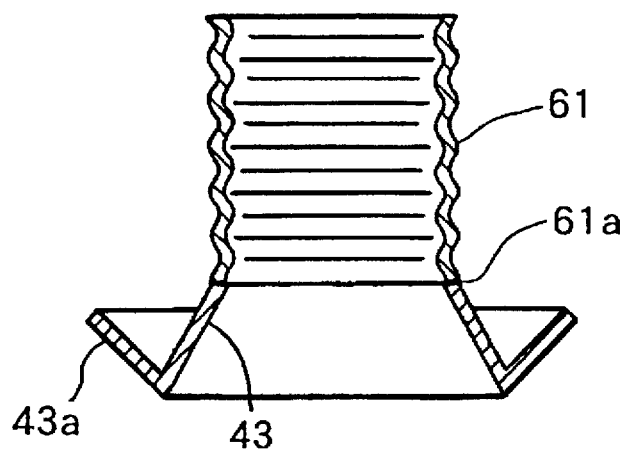
FIG. 7 is a front sectional view showing a bellows using the vacuum sealing structure according to the present invention.

FIGS. 5 to 7 are explanatory views showing an example of a body to be sealed. FIG. 5 is a partially cutaway view in section showing the port 41. The cylinder 43 having a sheetmetal-like jaw member 43a is sealed against the glass sheet 45 by means of a sealing part 47 formed of melt glass.

FIG. 6 shows how the cylinder 43, with a sheetmetal-like jaw member 43a, is sealed against a current introductory terminal 51.

FIG. 7 shows how the cylinder 43 with a sheetmetal-like jaw member 43a is sealed against a bellows 61 (sealed at 61a) at one end thereof. In addition, a desired member, system or vacuum chamber is vacuum sealed and coupled with the other end of the bellows 61.

Figure 8:
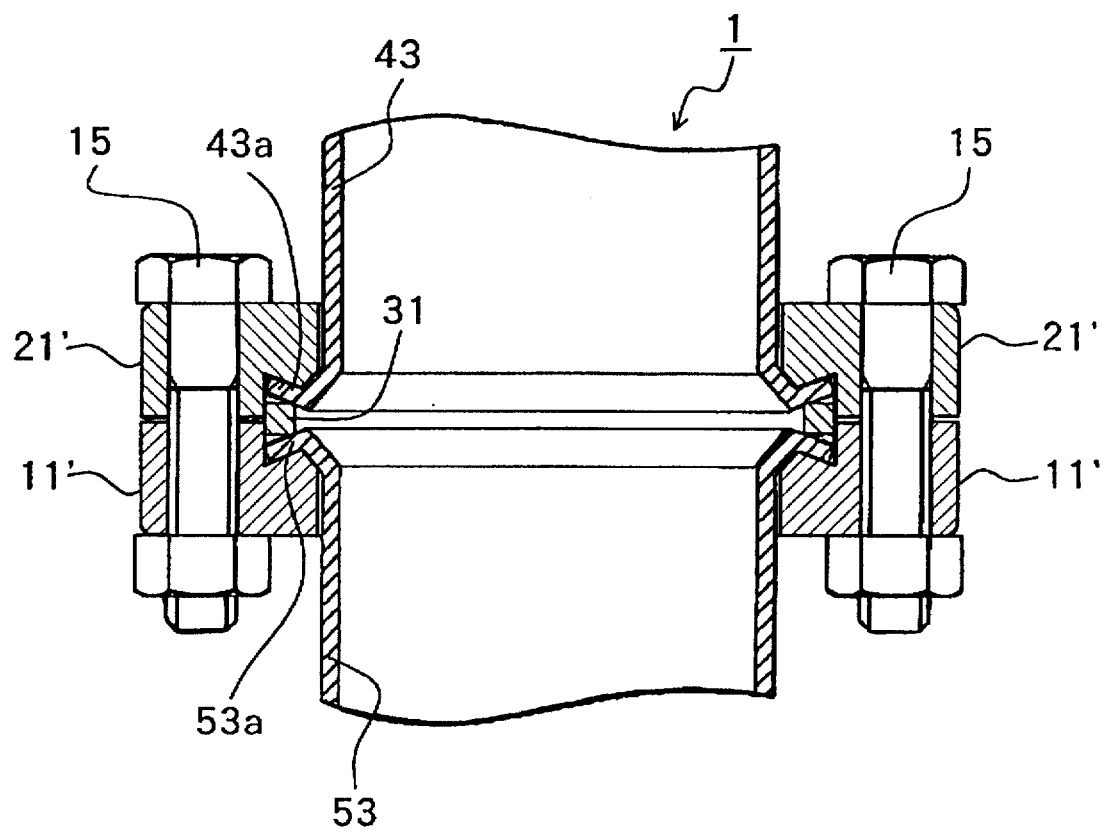
FIG. 8 is a front sectional view showing another embodiment of the vacuum sealing structure with a partially modified flange for connecting pipes with each other.
Figure 10:
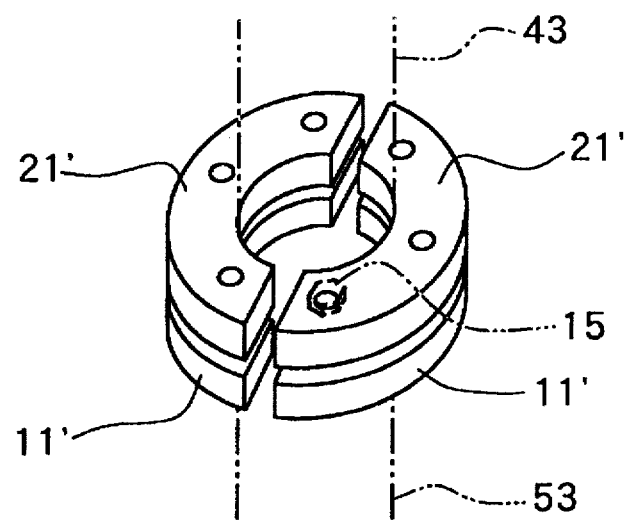
FIG. 10 is a perspective view showing a flange divided into two portions.
Figure 11:
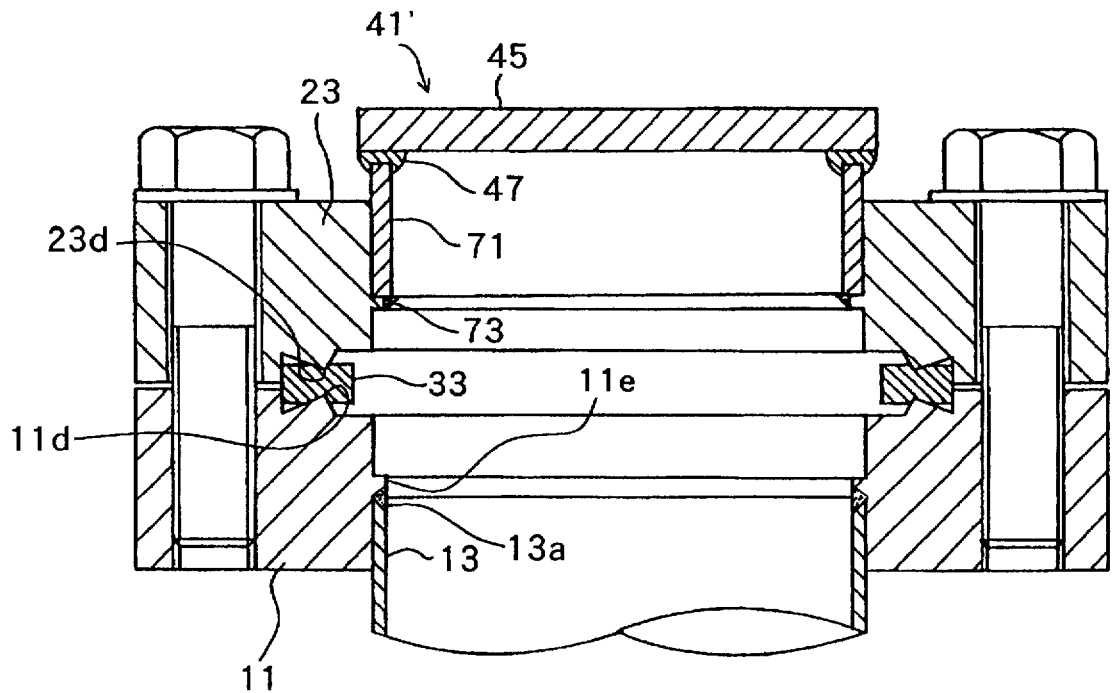
FIG. 11 is a front sectional view showing a vacuum sealing structure of a conventional viewing port.
Figure 12:
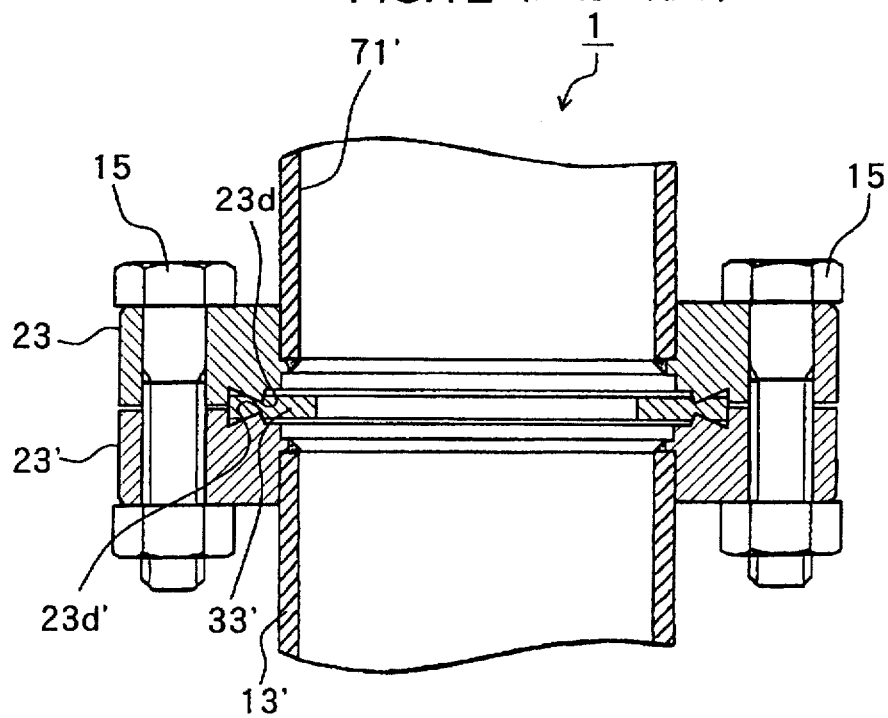
FIG. 12 is a front sectional view showing a vacuum sealing structure of a conventional pipe joint.

The embodiment, partially modified, of the present invention will be described with reference to FIGS. 8 and 10. The modified embodiment is different from the first described embodiment with respect to the flange on the body side and connection part (pipe) 13. The other same parts have the same symbols but explanation thereof is omitted.

A vacuum sealing structure 1 of the embodiment connects a cylinder 43 with another cylinder 53, both being pipes, while maintaining a state of vacuum. FIG. 8 is a front elevation of the structure 1.

At the upper end of the cylinder 53 there is formed a jaw 53a broadened outwardly like the cylinder 43 of the foregoing embodiment. Like the flanges 11 and 21 of the above-mentioned embodiment, the flanges 11' and 21' are provided with sealed grooves (tapered grooves) 11a and 21a'. The flanges 11' and 21' are, as shown in FIG. 10, divided into two, respectively, so that it is not necessary to let them pass into the cylinders 43 and 53 in advance.

Figure 9:
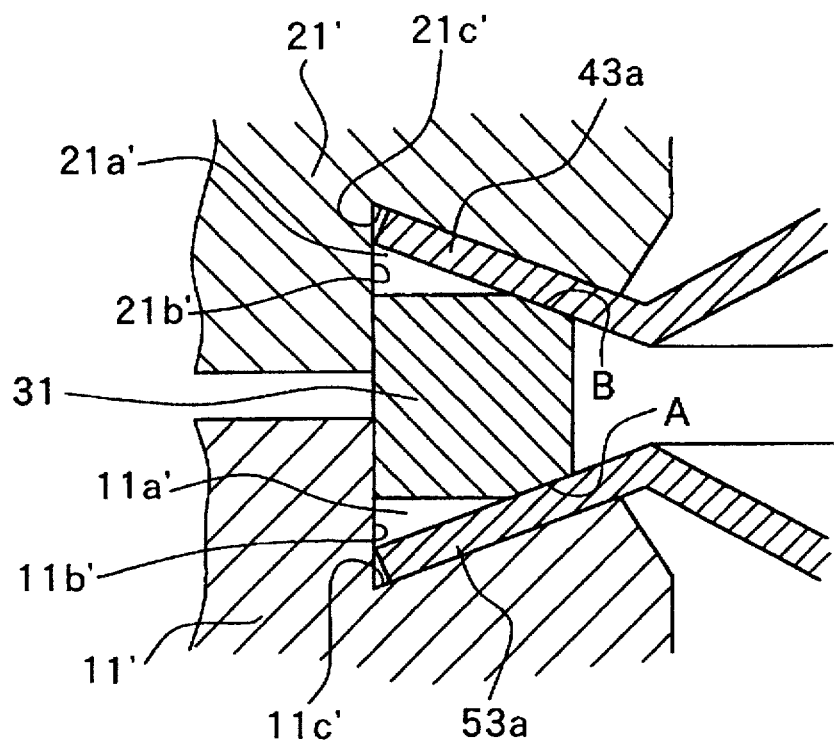
FIG. 9 is a partially enlarged sectional view showing the proximity of a rectangular metallic gasket shown in FIG. 8.

With this arrangement, the flanges 11' and 21' are drawn toward each other by means of bolts 15. As a result, the sealed grooves (tapered grooves) 11a' and 21a' of the flanges 11' and 21' make the jaw members 43a and 53a press tightly against the rectangular, metallic gasket 31. The outer circumferential surfaces of the gasket 31 are thereby pressed tight against the sealed grooves 11a' and 21a' at the outer circumferential walls 11b and 21b' of the flanges 11' and 21' while the inner corners X and Y (FIG. 4) of the gasket 31 are plastically deformed or flattened against the jaw members 43a and 53a as shown in FIG. 9 at the pressed portions A and B. Thus, vacuum airtightness is maintained and the interior of the cylinders 43, 53 are effectively sealed from the atmosphere.

Test Data

In an experiment of the vacuum sealing structure according to the present invention, the flange 11 on the body side and the outer flange 21 made of stainless steel were used, and the sealing structure as shown in FIG. 1 through FIG. 3 was constructed. The cylinder 43, made of kovar, and the rectangular metallic gasket made of oxygen-free copper were respectively used.

The outer flange 21 was tightly pressed with a fastening torque of 71 kg. A thermal test, in which the temperature was increased to 350° C. at a rate of 24° C./minute, and maintained at 350° C. for 30 minutes before being reduced to room temperature level, was repeated ten times, recording a rate of less than $1 \times 10^{-11}$ Torr.l/sec. of leakage from the vacuum chamber equipped with the viewing port 41. It was a very good result of non-leakage.

As described above, the present invention provides a vacuum sealing structure which seals vacuum sealing bodies by bringing and pressing the sheetmetal-like jaw portion of a viewing port into contact with and against a rectangular, metallic gasket in tapered groove(s) of a pair of the flanges In addition, as the vacuum sealing structure does not require the target body to be secured to a flange, no trouble with welding for securing and sealing will be caused. If the target body to be sealed is damaged, all that is necessary is to replace the body itself, thus facilitating maintenance.

Furthermore, vacuum materials are expensive as a rule and need certain features in terms of weldability and low outgassing rates. However, only cylinders or piping members may be used. Besides, there is no limit to the material quality of flange members. These make it possible to manufacture a vacuum sealing structure at a low cost and eliminate the necessity of welding flange members and cylinders for piping. As seen from above, such flange members are recyclable and economical as well.

Since flange members are divided by construction into two, cylinders for piping may be connected in an easier manner and it is not necessary to fit a flange member into a cylinder in advance. Accordingly, the manufacture of the pipe joint is easier which reduces costs. This shows that complicated operations to form jaws at the both ends of a cylinder with a flange member fit can be streamlined.

Technical Advantages of the Invention

It is thus made possible to produce a vacuum sealing structure to readily seal a target body (2) by bringing a rectangular, metallic gasket (31) into close contact with the sheetmetal-like jaw member of the target body (2) such as a viewing port (41) between and pressed tight against each other by a pair of flanges having tapered inner sides.

It is also made possible to realize a vacuum sealing structure to seal pipes (43, 53) by bringing jaw members (43a, 53a), made from the pipe edges which are broadened outwardly, into direct contact with a rectangular, metallic gasket (31). The jaw members (43a, 53) are secured in tapered grooves (21a', 11a') by fastening the flanges (11', 21') using fastening members (15) and pressing tight the gasket (31) against the tapered jaw members (43a, 53a). According to the vacuum sealing structure (1), it is not necessary to secure the target body (2) to any flange, so there will be no trouble with welding for securing, and sealing. If the target body is damaged, all that is necessary is replace the body itself. Maintenance is thus so easy. Also, it is not necessary to weld the flange (11') with the pipe (53) or the flange (21') with the pipe (43). If any of the pipes (43, 53) are damaged, all that is necessary is replace the pipe in question, enabling maintenance to be facilitated.

The symbols as shown above in ( ) are intended to be only for reference to the figures, and give no definition of the elements of the invention.

Availability of the Invention in the Field

As described above, the vacuum sealing structure in accordance with the invention is available for the vacuum sealing and mounting, via a flange, of parts, such as a viewing port, onto a vacuum apparatus including a vacuum evaporation apparatus, a spattering system, a plasma generator and a high vacuum experiment equipment. In such an instance, if parts such as a viewing port are replaced, it is not necessary to replace the flange, thereby reducing expenses. It is also not necessary to weld the viewing port to the flange, and any flange may be used in terms of material because no restriction which might exist because of welding is observed.

Instead of a viewing port, a current introductory terminal may be used for the vacuum sealing structure to introduce current to an electric equipment member or an actuator under vacuum.

In addition, when the rotation or swing in the atmosphere drives into a vacuum chamber, the vacuum sealing structure may be used by forming the jaw at a margin of a bellows.

When pipes are to be coupled with each other, a vacuum sealing structure according to the invention may apply to the coupling. If this is the case, there will be no need to replace flanges while replacing cylinders or pipe members. The cost will be reduced, and it will be unnecessary to weld the flange to the cylinder. This will cause no restriction, which must be taken into account, of the selection of flanges in terms of the material quality.

What is claimed is:

1. A vacuum sealing structure comprising:

a first connection part including a pipe section having an outwardly tapered end portion forming an annular tapered jaw;

a support member defining an annular tapered groove, said support member being independent of said pipe section;

a second connection part connected to said support member;

a metal gasket disposed in said annular tapered groove, wherein said jaw is interposed between a surface of said tapered groove and said gasket; and a fastening member for tightening said support member so as to press said annular tapered jaw against said gasket so that a portion of said gasket engaging said annular tapered jaw is plastically deformed.

2. The vacuum sealing structure as claimed in claim 1, wherein said support member is divided into at least two discrete portions.

3. The vacuum sealing structure as claimed in claim 2, wherein said support member includes a vertical wall portion which defines a vertical outer wall of said annular tapered groove.

4. The vacuum sealing structure as claimed in claim 2, wherein said gasket is annular and has a rectangular cross section.

5. The vacuum sealing structure as claimed in claim 4, wherein said support member includes a vertical wall portion which defines a vertical outer wall of said annular tapered groove.

6. The vacuum sealing structure as claimed in claim 1, wherein said gasket is annular and has a rectangular cross section.

7. The vacuum sealing structure as claimed in claim 6, wherein, upon tightening of said support member, inner corners of said rectangular cross section of said gasket are flattened so as to conform with a surface of said annular tapered jaw and a tapered surface of said annular tapered groove, respectively.

8. The vacuum sealing structure as claimed in claim 6, wherein said support member includes a vertical wall portion which defines a vertical outer wall of said annular tapered groove.

9. The vacuum sealing structure as claimed in claim 1, wherein said support member includes a vertical wall portion which defines a vertical outer wall of said annular tapered groove.

10. The vacuum sealing structure as claimed in claim 1, wherein said gasket is entirely located within said annular tapered groove.

* * * * *